UNITED STATES PATENT OFFICE.

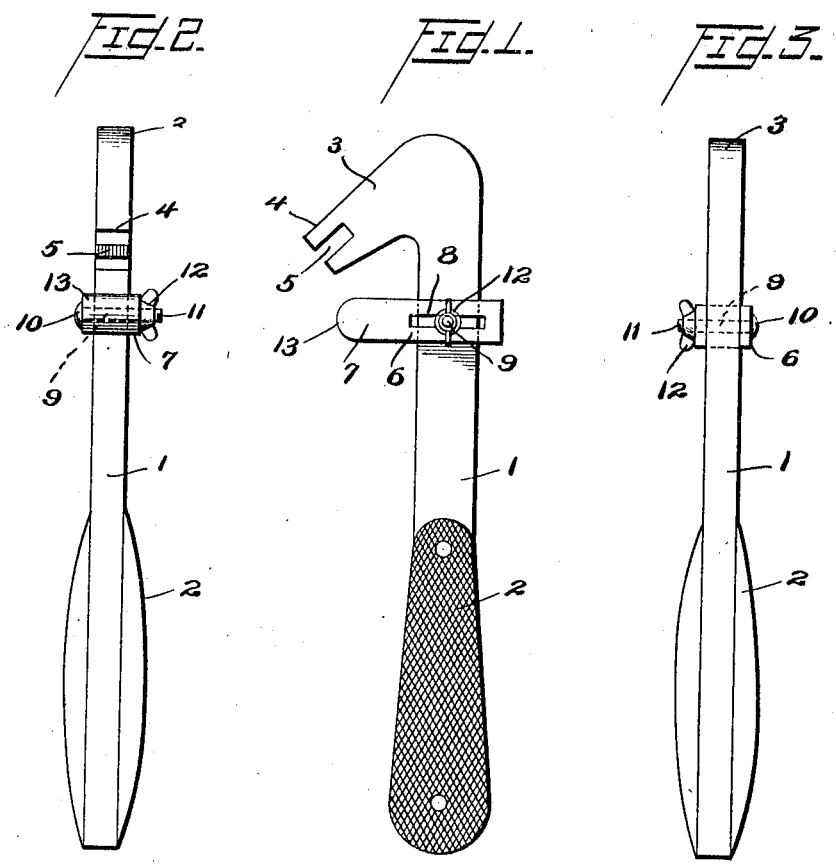

JACOB F. CHERVENKA, OF CASEY, IOWA.

SAW-SET.

1,298,459.

Specification of Letters Patent.

Patented Mar. 25, 1919.

Application filed May 3, 1916, Serial No. 95,050. Renewed February 20, 1919. Serial No 278,239.

*To all whom it may concern:*

Be it known that I, JACOB F. CHERVENKA, a citizen of the United States, residing at Casey, in the county of Guthrie and State of Iowa, have invented certain new and useful Improvements in Saw-Sets, of which the following is a specification.

My invention relates to saw-sets.

The object of my invention is to produce a saw-set in which means are provided to regulate and make uniform the angle at which the teeth of a saw are spread. A further object thereof is to produce an adjustable gage carried upon the shank of a saw-set adapted to contact with the body of a saw when the teeth thereof have been spread at a pre-determined angle; and a still further object of my invention is to produce a more simple, cheap and efficient device of the character described than has heretofore been attained.

To these ends my invention includes the combination and arrangement of component parts to be hereinafter described and more particularly pointed out in the claim.

In the accompanying drawings, in which like reference characters indicate similar parts:

Figure 1 is a side view of my invention.

Fig. 2 is a front view; and

Fig. 3 is a back view of the same.

Referring now to the drawings, 1 indicates a metal shank, one end of which is formed as a gripping handle 2. The opposite end is formed into a hook-shaped head 3 having the laterally extending and downwardly turned arm 4. The outer end of said arm is provided with a transverse slot 5 adapted to engage the teeth of a saw and spread them at the desired angle.

For the purpose of regulating the angle at which the teeth of a saw may be spread to a pre-determined and uniform degree, I provide the adjustable gage 6 carried on the shank 1 intermediate of the head 3 and handle 2. Said gage comprises a transverse arm 7 having its inner end bifurcated to straddle the shank and the bifurcated portions are provided with a longitudinal slot 8, through which the bolt 9 projects. Said bolt extends through a transverse eye in the shank 1 and is provided with a head 10 at one end, while the opposite end is screw-threaded at 11 to receive the wing nut 12 by which the gage 6 may be adjustably secured upon the shank. The outer end of the gage 6 is preferably rounded at 13 where it bears against the body of the saw in use.

From the foregoing description and by reference to the accompanying drawings it will be obvious that the gage 6 may be adjustably positioned inwardly and outwardly on the shank 1 and may also be adjusted pivotally on the bolt 9 so that its angle with respect of the shank and the point of contact between the end 13 and body of the saw may be determined and regulated; and it will be appreciated that by the adjustment of the gage, as thus described, the angle at which the teeth of a saw are to be spread may be conveniently and uniformly regulated.

Having thus described my invention, what I claim as new and desire to be secured by Letters Patent, is:

In a saw-set, the combination with a shank having a grip handle at one end, of a laterally extending rigid arm at the opposite end having a slot in the extremity thereof offset from said shank, a laterally-extending bifurcated adjustable arm carried on said shank astride thereof having a laterally extending slot in the bifurcated portion and a rounded head on the outer end thereof, a transverse bolt extending through said shank and slotted portion of the arm, and a clamp nut on said bolt for adjustably fastening the head of said slotted arm in relation to the end of the rigid arm, substantially as described.

In testimony whereof I hereby affix my signature in presence of two witnesses.

JACOB F. CHERVENKA.

Witnesses:
S. C. HUBER,
A. A. LIND.

Copies of this patent may be obtained for five cents each, by addressing the "Commissioner of Patents, Washington, D. C."